United States Patent [19]

Momura et al.

[11] Patent Number: 4,726,959
[45] Date of Patent: Feb. 23, 1988

[54] FAT BLOOMING INHIBITOR

[75] Inventors: Masaki Momura; Akira Nakano; Minoru Nakamura, all of Ibaraki, Japan

[73] Assignee: Kao Corporation, Tokyo, Japan

[21] Appl. No.: 831,391

[22] Filed: Feb. 20, 1986

[30] Foreign Application Priority Data

Mar. 1, 1985 [JP] Japan ................................ 60-40864

[51] Int. Cl.⁴ ........................ A23D 5/00; A23D 3/00
[52] U.S. Cl. .................................. 426/607; 426/610
[58] Field of Search ..................... 426/607, 610, 633

[56] References Cited

U.S. PATENT DOCUMENTS 2,979,407  4/1961  Duck .......................... 426/607 X
3,600,195  8/1971  Westenberg ..................... 426/607
4,341,814  7/1982  McCoy ............................ 426/607

FOREIGN PATENT DOCUMENTS 47-26693  7/1972  Japan .................................. 426/607
57-16648 12/1983  Japan .................................. 426/607

OTHER PUBLICATIONS

Minifig, B. W., "Chocolate, Cocoa and Confectionery", Avi Publ. Co., Inc., Westport, Conn., 1980, pp. 504–507.

"The Merck Index" (Tenth Edition), published by Merck & Co. Inc. 1983, title page and pp. 1012 and 1013.

Primary Examiner—Raymond N. Jones
Assistant Examiner—Celine Callahan
Attorney, Agent, or Firm—Flynn, Thiel, Boutell & Tanis

[57] ABSTRACT

A mixed acid triglyceride inhibits a hard butter from fat-blooming, having as the main acid moiety 15 to 70 wt. % of saturated fatty acids having 20 to 24 carbon atoms and 20 to 60 wt. % of unsaturated fatty acids having 16 to 22 carbon atoms.

7 Claims, No Drawings

FAT BLOOMING INHIBITOR

This invention relates to a fat blooming inhibitor for hard butter products. More particularly it relates to a fat blooming inhibitor for tempered and/or non-tempered chocolates.

DESCRIPTION OF PRIOR ART

Chocolates and other hard butter products are prone to appear powder-coated when stored at labile temperatures. This phenomenon is called fat blooming and damages the commercial value of these products.

It is generally believed that fat blooming is caused by the polymorphic behavior of fat crystals. That is, cocoa butter, which is a typical example of tempered hard butter, is most stable in the $\beta$-forms. When unstable $\beta'$-forms of cocoa butter are present in a chocolate, they would transform into more stable $\beta$-forms upon storage. Thus the crystals grow, which brings about fat blooming. In the production of tempered chocolates or tempered hard butter products, unstable crystals are transformed into stable ones by the tempering process, in which a large amount of stable crystals are increased, thus preventing the fat blooming as described above. It is also believed that fat blooming in non-tempered hard butter products comprising lauric and/or non lauric acids is caused by polymorphic behavior of fats similar to tempered hard butter products. That is, non-tempered hard butter crystals are generally stable in $\beta'$-forms, while cocoa butter crystals are stable in $\beta$-forms. When these fats are molten together, crystals obtained immediately after solidification are in $\beta'$-forms. When the cocoa butter is blended in a small amount, these $\beta'$-forms remain as such for a long period. However they would transform into $\beta$-forms with an increase in the amount of the cocoa butter. Thus the crystals grow to thereby bring about fat blooming. Therefore the amount of cocoa butter to be blended for producing non-tempered chocolates is presently restricted to a level at which no fat blooming is observed.

Furthermore fat blooming is frequently observed when a chocolate is stored at high and labile temperatures. This is because the melted chocolate fats at the surface or the melted ones which migrate to the surface from the inside of the chocolate would crystallize and grow repeatedly at the surface of chocolate to thereby bring about fat blooming. This fact makes the prolonged storage of chocolates difficult so that it has been urgently required to develop a method for inhibiting fat blooming even at labile temperatures.

In order to prevent fat blooming in hard butter products such as chocolates, there have been attempts to improve the process for the production of these products, to develop a substitute fat highly compatible with cocoa butter and to develop a fat blooming inhibitor as an additive.

Conventional methods are proposed to prevent fat blooming by adding a fat blooming inhibitor. The first method, for example, disclosed in Japanese Patent Publication Nos. 26823/1971 and 26824/1971 is addition of specially fixed triglycerides consisting of long chain fatty acids and short chain fatty acid in a specified ratio. These triglycerides are added to the chocolate in an amount of 10 to 30% based on the total fat component of a chocolate to prevent or suppress the transformation of crystal forms of cocoa butter or other hard butter crystals, thus preventing fat blooming. The second method disclosed in Japanese Patent Laid-Open No. 60945/1983 is addition of steroidal compounds in an amount of 0.1 to 8.0% by weight to starting fats for a chocolate to suppress localization, aggregation and migration of particular constituents, thus improving the blooming resistance of the chocolate. And the third method disclosed in Japanese Patent Laid-Open No. 198245/1983 is the addition of high melting triglycerides consisting of long-chain saturated fatty acid residues, e.g. behenic acid, in case of non-tempered chocolate in which the cocoa butter content is less than 33 wt.% of total fat content, in an amount of 0.2 to 10% based on the fat component of a chocolate to suppress the growth of large crystals of fats by microcrystallizing fats in the chocolate, thus preventing blooming.

PROBLEMS TO BE SOLVED BY THE INVENTION

As described above, there have been attempts to improve a production process, to improve the quality of hard butter and to develop a fat blooming inhibitor in order to prevent fat blooming of hard butter products such as chocolates. These prior art techniques include decreasing unstable crystal forms in a chocolate, suppression of localization, aggregation and migration of unstable crystals, microcrystallization of fats and suppression of transformation of unstable crystal forms into stable ones to thereby improve the fat blooming resistance of a chocolate or similar products.

However any conventional art is insufficient in preventing fat blooming of hard butter products such as chocolates caused by molten fats upon storage at high and labile temperature. Thus it has been urgently required to establish a method for suppressing or preventing fat bloom of a chocolate when stored at a prolonged period under conditions wherein the temperature is so high or labile that the chocolate is partly molten.

MEANS FOR SOLVING PROBLEMS

We have studied to overcome these problems and consequently found that mixed acid triglycerides composed saturated fatty acid residues having 20 to 24 carbon atoms and unsaturated fatty acids residues having 16 to 22 carbon atoms together in the same molecule are effective in suppressing fat blooming of hard butter products such as chocolates caused by molten fats upon storage at labile temperatures, thus completing the present invention.

A fat blooming inhibitor of the invention is novel and whose main triglyceride components are the mixed acid triglycerides comprising saturated fatty acid residues having 20 to 24 carbon atoms and unsaturated fatty acid residues, and total fatty acid components being 15 to 70 wt.% of the above mentioned saturated fatty acids and 20 to 60 wt.% of the above mentioned unsaturated fatty acids.

It is preferred that a total amount of said mixed acid triglycerides ranges from 40 wt.% to 100 wt.%, more preferably from 50 to 100 wt.%, based on the entire triglyceride.

The invention also provides a hard butter composition comprises a hard butter and 0.5 to 30 wt.% of the fat blooming inhibitor.

Accordingly the present invention provides a fat blooming inhibitor whose main triglyceride components are the mixed acid triglycerides comprised saturated fatty acid residues having 20 to 24 carbon atoms and unsaturated fatty acid residues having 16 to 22 carbon atoms together in the same molecule, and total fatty acid component being 15 to 70 wt.% of above mentioned saturated fatty acids and 20 to 60 wt.% of above mentioned unsaturated fatty acids.

The fat blooming inhibitor of the present invention, which will be referred to as the invention inhibitor hereinafter, mainly consists of saturated fatty acid(s) having 20 to 24 carbon atoms, preferably arachic and behenic acids, more preferably behenic acid; and unsaturated fatty acid(s) having 16 to 22 carbon atoms, preferably those having 18 carbon atoms such as oleic, linoleic and linolenic acids.

According to another preferred embodiment of the invention, a mixed acid triglyceride inhibits a hard butter from fat-blooming, having as the main acid moiety 30 to 70 wt.% of saturated fatty acids having at least 20 carbon atoms and 20 and 60 wt.% of unsaturated fatty acids having 16 to 22 carbon atoms.

The most typical examples of the triglyceride which is the main constituent of the invention inhibitor are dibehenyl monolinoate and monoleate. The saturated fatty acids may be partly substituted by palmitic acid, stearic acid, arachic acid, a mixture thereof. An unsaturated fatty acid may be bonded at either α- or β-position or a mixture thereof may be employed.

Now a process for the production of the invention inhibitor will be described not by way of limitation but by way of example.

The invention inhibitor can be obtained by interesterification of oils, for example, a fatty acid triglyceride containing at least 30% by weight of saturated fatty acid(s) having 20 to 24 carbon atoms such as behenic triglyceride or hydrogenated, high-erucic rapeseed oil or hydrogenated fish oil and/or the mixture of them with the other glycerides, and vegetable oil(s) containing at least 60% by weight of unsaturated fatty acid(s), such as soybean, olive, rapeseed and safflower oils and/or mixtures thereof, being subjected to an interesterification. The ability of invention inhibitor may be improved by fractionation of rearranged oils thus obtained, because of removing the trisaturated glycerides which affect the melting profiles and/or triunsaturated glycerides which affect to the hardness of chocolate. The interesterification is carried out to randomly rearrange the fatty acid residues. A conventional catalyst, e.g. sodium methylate, is added in an amount of 0.1 to 0.3% by weight of the oils. The reaction is performed at 70° to 150° C. After the completion of the reaction, the catalyst is washed out with water. In the case of fractionation solvent(s) conventionally employed in fractionating oils, e.g. n-hexane or acetone can be used in an amount two to 10 times as much as the oil. The rearranged oil is dissolved in the solvent(s) and the solution is cooled. Trisaturated glycerides thus separated out at 0° to 40° C. are filtered (the first step). The filtrate is cooled to −25° to 25° C. and a fraction mainly consisting of mixed acid triglycerides is collected to thereby give the invention inhibitor (the second step). When the solvent used in the first step differs from that used in the second step, the solvent in the filtrate obtained in the first step is distilled off and the residue is dissolved in the other solvent in an amount two to 10 times as much thereof and cooled to −25° to 25° C. Then the fraction thus separated out, which mainly consists of mixed acid triglycerides, is collected to give the invention inhibitor.

Alternately the invention inhibitor may be produced by subjecting vegetable oil(s) consisting of at least 60% by weight of unsaturated fatty acid(s) at the β-position, such as soybean, olive and safflower oils or a mixture thereof, and saturated fatty acid(s) having 20 to 24 carbon atoms to an enzymatically selective interesterification and removing the fatty acid(s) from the rearranged oil. By fractionation the invention inhibitor can be concentrated. The invention inhibitor prepared by this method is highly compatible with cocoa butter since it has a triglyceride structure wherein saturated fatty acids are bonded at the α- and α'-positions while an unsaturated fatty acid is bonded at the β-position similar to that of cocoa fat.

The present invention relates to a fat blooming inhibitor which comprises mixed acid triglyceride(s) each mainly consisting of saturated fatty acid(s) having 20 to 24 carbon atoms and unsaturated fatty acid(s) having 16 to 22 carbon atoms. The addition of the invention inhibitor to hard butter products such as chocolates significantly improves the blooming resistance thereof.

The invention inhibitor may be added in an amount of 0.5 to 30% by weight, preferably 2 to 20% by weight, of the fat component of a hard butter product such as chocolate. The fat blooming inhibiting effect of the invention inhibitor increases with an increase in the amount of the same.

EFFECTS

We take advantage of highly specific properties of mixed acid triglycerides each mainly consisting of saturated fatty acid(s) having 20 to 24 carbon atoms and unsaturated fatty acid(s) having 16 to 22 carbon atoms in preventing fat blooming.

That is, mixed triglycerides whose main triglyceride components are the mixed acid triglycerides comprising saturated fatty acid residues having 20 to 24 carbon atoms and unsaturated fatty acid residues having 16 to 22 carbon atoms together in the same molecules, and total fatty acid component being 15 to 70 wt.% of above mentioned saturated fatty acids and 20 to 60 wt.% of above mentioned unsaturated fatty acids, and specially disaturated monounsaturated glyceride differ from general fats and are in the form of a spreadable, transparent and waxy solid like acetin fat. These triglycerides crystallize into microplates when molten followed by either gradual or rapid cooling. These microcrystals remain as such without growing even when stored over a prolonged period. These triglycerides further exhibit specific effects when added to other fats. That is, they convert the crystals of other fats into microcrystals and suppress the growth of the resulting microcrystals. No usual fat shows such effects.

We have applied these effects of the triglycerides of converting crystals of other fats into microcrystals and of suppressing the growth of the resulting microcrystals to hard butter products such as chocolates, thus achieving the present invention. That is, the fat blooming inhibiting effect of the invention inhibitor comprises suppressing localization, aggregation and migration of unstable crystals in a hard butter product such as chocolate by converting these crystals into microcrystals; and suppressing the growth of fat crystals formed by repeated melting of the surface of the chocolate and crystallization of some portion of fat crystals therein melting and migrating into the surface. It is believed that these suppression mechanisms of the triglycerides are combined together, thus bringing about the fat blooming inhibiting effect of the same.

PREFERRED EMBODIMENTS OF THE INVENTION

To further illustrate the present invention, and not by way of limitation, the following synthesis Examples and Examples will be given. All percentages in the Synthesis Examples and Examples are by weight.

SYNTHESIS EXAMPLE 1

An oil mixture of 50% of behenic triglyceride (fatty acid composition: 2.4% of stearic acid, 9.9% of arachic acid and 84.9% of behenic acid) and 50% of olive oil (fatty acid composition: 10.9% of palmitic acid, 3.7% of stearic acid, 80.5% of oleic acid and 5.0% of linolic acid) was subjected to an interesterification at 80° C. for 30 min with the use of 0.1% of sodium methylate based on the oil to give an ester-exchanged oil. The rearranged oil was dissolved in n-hexane in an amount of 4 ml per g of the oil. The obtained solution was cooled from 40° to 28° C. under stirring. The fraction thus separated out, which mainly consisted of trisaturated glycerides having a high melting point, was filtered to give a yield of 14% based on the rearranged oil. After distilling off the solvent in the filtrate in a conventional manner, the residue was dissolved in acetone in an amount of 5 ml per g of the residue. The obtained solution was cooled from 30° to 10° C. under stirring. Then the aimed fraction thus separated out was collected.

After distilling off the solvent in the fraction, the residue was deodorized in a conventional manner to give the invention inhibitor (1).

SYNTHESIS EXAMPLE 2

An oil mixture of 50% of behenic triglyceride (fatty acid composition: 2.4% of stearic acid, 9.9% of arachic acid and 84.9% of behenic acid) and 50% of safflower oil (fatty acid composition: 6.9% of palmitic acid, 2.7% of stearic acid, 13.0% of oleic acid and 76.0% of linolic acid) was subjected to an interesterification followed by solvent fractionation in the same manner as described in Synthesis Example 1 to give the aimed invention inhibitor (2).

SYNTHESIS EXAMPLE 3

An oil mixture of 50% of wholly hydrogenated high-erucic rapeseed oil (fatty acid composition: 3.9% of palmitic acid, 41.3% of stearic acid, 5.5% of arachic acid and 46.9% of behenic acid) and 50% of safflower oil (fatty acid composition: 6.9% of palmitic acid, 2.7% of stearic acid, 13.0% of oleic acid and 76.0% of linolic acid) was subjected to an interesterification in the same manner as described in Synthesis Example 1. The obtained rearranged oil was dissolved in acetone in an amount of 5 ml per g of the oil. The obtained solution was cooled to 35° C. under stirring and the fraction, which mainly consisted of trisaturated glycerides having a high melting point, thus separated out was filtered to give a yield of 26% based on the rearranged oil. The filtrate was cooled to 10° C. under stirring and the crystals thus separated out were collected. After distilling off the solvent, the residue was deodorized in a conventional manner to give the invention inhibitor (3).

SYNTHESIS EXAMPLE 4

50% of olive oil (fatty acid composition: 10.9% of palmitic acid, 3.7% of stearic acid, 80.5% of oleic acid and 5.0% of linolic acid) and 50% by weight of behenic acid (fatty acid composition: 2.7% of stearic acid, 9.8% of arachic acid and 85.8% of behenic acid) were dissolved in hexane in an amount five times (by weight) as much as the fatty acids. Then 520 lipase units per g of the starting oils of a lipase having reaction specifity to the α-position of triglyceride (a product of Tanabe Seiyaku Co., Ltd.; originating from Rhizopus delemar) adsorbed by 10% by Celite based on the starting oils was added to the oils and the oils were subjected to an enzymatically selective interesterification at 45° C. for 72 hours. After the completion of the reaction, the reaction liquor was filtered and the hexane in the filtrate was distilled off. Then the fatty acids in the residue were removed by molecular distillation at 210° to 230° C./0.05 to 0.07 mmHg. The enzymatically selectively rearranged oil from which the fatty acids were removed was dissolved in acetone in an amount of 5 ml per g of the oil. The obtained solution was cooled from 30° to 10° C. under stirring and the crystals thus separated out were collected. After further distilling off the solvent, the residue was deodorized in a conventional manner to give the invention inhibitor (4).

SYNTHESIS EXAMPLE 5

An oil mixture of 33% by wholly hydrogenated high-erucic rapeseed oil used in Synthesis Example 3 and wholly hydrogenated palm oil (fatty acid component: 1.3% of myristic acid, 43.6% of palmitic acid, 54.2% of stearic acid, 0.6% of arachic acid) and 50% of soybean oil (fatty acid component: 10.4% of palmitic acid, 4.1% of stearic acid, 24.5% of oleic acid, 52.8% of linolic acid, 7.4% of linolenic acid) was subjected to an interesterification in the same manner as described in Synthesis Example 1. The obtained rearranged oil was dissolved in acetone in an amount of 5 ml per g of the oil. The obtained solution was cooled at 30° C. under stirring and the fraction, which mainly consisted of trisaturated glycerides having a high melting point, thus separated out was filter to give a yield of 27% based on the rearranged oil. The filtrate was cooled to 6° C. under stirring and the crystals thus separated out were collected. After distilling off the solvent, the residue was deodorized in a conventional manner to give the invention inhibitor (5).

Table 1 shows analytical data of the inhibitors (1) to (5) obtained in Synthesis Examples 1 to 5, respectively, while Table 2 shows the triglyceride compositions of the same determined by gas chromatography.

TABLE 1

| | Yield (%)[*1] | Iodine value | Melting point (°C.) | Fatty acid composition (%)[*2] | | | | | | | |
|---|---|---|---|---|---|---|---|---|---|---|---|
| | | | | $C_{16}$ | $C_{18}$ | $C_{18=1}$ | $C_{18=2}$ | $C_{18=3}$ | $C_{20}$ | $C_{22}$ | $C_{24}$ |
| Invention inhibitor (1) | 43.7 | 32.5 | 43.2 | 4.5 | 2.4 | 28.2 | 3.8 | 0.3 | 4.7 | 53.4 | 2.0 |
| | | | | 4.7 | 2.4 | 28.5 | 3.6 | 0.3 | 4.5 | 54.2 | 1.8 |
| | | | | 3.7 | 2.4 | 4.9 | 29.8 | 0.1 | 3.2 | 53.9 | 2.0 |
| Invention inhibitor (2) | 46.9 | 56.8 | 41.9 | 3.5 | 2.3 | 5.1 | 30.4 | 0.2 | 3.4 | 53.2 | 1.9 |
| | | | | 4.3 | 17.3 | 3.7 | 28.6 | 0.1 | 6.8 | 38.8 | 1.4 |
| Invention inhibitor (3) | 32.6 | 53.7 | 42.1 | 4.6 | 16.8 | 4.0 | 28.9 | 0.2 | 6.9 | 37.0 | 1.6 |
| | | | | 3.7 | 2.9 | 32.4 | 1.9 | 0.8 | 5.0 | 52.0 | 1.6 |

TABLE 1-continued

| | Yield (%)*1 | Iodine value | Melting point (°C.) | Fatty acid composition (%)*2 | | | | | | | |
|---|---|---|---|---|---|---|---|---|---|---|---|
| | | | | $C_{16}$ | $C_{18}$ | $C_{18=1}$ | $C_{18=2}$ | $C_{18=3}$ | $C_{20}$ | $C_{22}$ | $C_{24}$ |
| Invention inhibitor (4) | 68.5 | 32.0 | 44.3 | 1.6 | 0.3 | 81.5 | 8.0 | 1.6 | 0.3 | 5.2 | 0.2 |
| | | | | 16.2 | 29.5 | 9.7 | 20.1 | 3.8 | 2.5 | 18.8 | — |
| Invention inhibitor (5) | 33.5 | 50.5 | 36.0 | 15.9 | 29.8 | 9.5 | 20.4 | 3.7 | 2.3 | 19.0 | — |

TABLE 2

| | Triglyceride composition (%) | | | | | | | |
|---|---|---|---|---|---|---|---|---|
| | $C_{50}$ | $C_{52}$ | $C_{54}$ | $C_{56}$ | $C_{58}$ | $C_{60}$ | $C_{62}$ | $C_{64}$ |
| Invention inhibitor (1) | — | 0.5 | 2.5 | 9.6 | 24.6 | 12.2 | 42.1 | 2.6 |
| Invention inhibitor (2) | — | 0.8 | 2.4 | 7.8 | 28.8 | 11.9 | 47.5 | 0.9 |
| Invention inhibitor (3) | — | 2.6 | 9.2 | 7.2 | 34.7 | 7.6 | 38.3 | 0.4 |
| Invention inhibitor (4) | — | 1.2 | 4.2 | 13.9 | 25.2 | 10.2 | 41.1 | 1.8 |
| Invention inhibitor (5) | 5.0 | 20.4 | 24.7 | 14.7 | 25.2 | 2.0 | 6.8 | 0.2 |

*$C_{50}$, $C_{52}$, $C_{54}$, $C_{56}$, $C_{58}$, $C_{60}$, $C_{62}$ and $C_{64}$ mainly consist of PPU, PSU, S2U, ASU, AAU and BSU, ABU, B2U and B2A, respectively, wherein P represents palmitic. acid, S represents stearic acid, U represents an unsaturated acid having 18 carbon atoms, A represents arachic acid and B represents behenic acid.

EXAMPLE 1

Chocolate products of the following composition containing the invention inhibitor (1) in various ratios were produced in the following manner and the fat blooming inhibiting effect of the inhibitor was determined by a blooming test.

| Chocolate composition | |
|---|---|
| chocolate liquor | 35% by weight |
| sucrose | 51% by weight |
| fat* | 13.6% by weight |
| lecithin | 0.3% by weight |
| flavor | 0.1% by weight |

*Comprising the invention inhibitor and cocoa butter.

PRODUCTION OF CHOCOLATE

Some portion was removed from the above fat to thereby adjust the fat content to 20%. Then the composition was passed through triple rolls three times. The residual fat was added thereto and the composition was conched at 55° C. for 72 hours, cooled to 30° C. and tempered for 10 min. After tempering, the composition was heated to 31° C. and poured into molds. The chocolate in each mold was solidified at 5° C. for one hour, taken out from the mold and aged at 20° C. for one week.

BLOOMING TEST

The chocolate aged for one week was stored under a condition wherein temperature was cyclically changed, i.e. 20° C. for 14 hours and 30° C. for eight hours, requiring each one hour for heating and cooling, to determine when blooming occurred.

Table 3 shows the blooming resistance of chocolate products containing the invention inhibitor (1) in various ratios.

TABLE 3

| | Fat composition (%)* | | Number of cycles |
|---|---|---|---|
| Ex. No. | Invention inhibitor (1) | Cocoa butter | until blooming occurred |
| Control | 0 | 100 | 5 |
| 1-1 | 1 | 99 | 12 |
| 1-2 | 2 | 98 | 18 |
| 1-3 | 5 | 95 | 31 |
| 1-4 | 10 | 90 | 46 |
| 1-5 | 20 | 80 | 57 |

*The ratio to the total fat constituent in chocolate (the same applies to Tables 4, 5, 6 and 13).

EXAMPLE 2

Chocolate products of the same composition as described in Example 1 containing the invention inhibitor (2) in various ratios were produced in the same manner as described in Example 1 and the blooming resistance of each product was examined. Table 4 shows the result.

TABLE 4

| | Fat composition (%) | | Number of cycles |
|---|---|---|---|
| Ex. No. | Invention inhibitor (2) | Cocoa butter | until blooming occurred |
| Control | 0 | 100 | 5 |
| 2-1 | 1 | 99 | 12 |
| 2-2 | 2 | 98 | 17 |
| 2-3 | 5 | 95 | 33 |
| 2-4 | 10 | 90 | 46 |
| 2-5 | 20 | 80 | 55 |

EXAMPLE 3

Chocolate products of the same composition as described in Example 1 containing the invention inhibitor (3) in various ratios were produced in the same manner as described in Example 1 and the blooming resistance of each product was examined. Table 5 shows the result.

TABLE 5

| | Fat composition (%) | | Number of cycles |
|---|---|---|---|
| Ex. No. | Invention inhibitor (3) | Cocoa butter | until blooming occurred |
| Control | 0 | 100 | 5 |
| 3-1 | 1 | 99 | 10 |
| 3-2 | 2 | 98 | 16 |
| 3-3 | 5 | 95 | 28 |
| 3-4 | 10 | 90 | 41 |
| 3-5 | 20 | 80 | 52 |

EXAMPLE 4

Chocolate products of the same composition as described in Example 1 containing the invention inhibitor (4) in various ratios were produced in the same manner as described in Example 1 and the blooming resistance of each product was examined. Table 6 shows the result.

TABLE 6

| Ex. No. | Fat composition (%) Invention inhibitor (4) | Fat composition (%) Cocoa butter | Number of cycles until blooming occurred |
|---|---|---|---|
| Control | 0 | 100 | 5 |
| 4-1 | 1 | 99 | 11 |
| 4-2 | 2 | 98 | 17 |
| 4-3 | 5 | 95 | 30 |
| 4-4 | 10 | 90 | 44 |
| 4-5 | 20 | 80 | 54 |

EXAMPLE 5

Non-tempered chocolate products of the following composition containing the invention inhibitor (1) were produced in the following manner and the fat blooming inhibiting effect of the inhibitor was examined by the same blooming test as described in Example 1.

| Chocolate composition | |
|---|---|
| cocoa powder | 11% |
| sucrose | 45% |
| skim milk powder | 10% |
| fat* | 33.6% |
| lecithin | 0.3% |
| flavor | 0.1% |

*Comprising the invention inhibitor, non-tempered butter and cocoa butter.

Table 7 shows characteristic data of the non-tempered hard butter used in this test.

TABLE 7

| I.V. | S.V. | A.V. | m.p. (open-tubed melting point: °C.) | trans-acid content (%) |
|---|---|---|---|---|
| 58.3 | 193.6 | 0.03 | 39.3 | 45.3 |

PRODUCTION OF CHOCOLATE

Some portion was removed from the above fat to thereby adjust the fat content to 20%. Then the composition was passed through triple rolls three times. The residual fat was added thereto and the composition was conched at 55° C. for 24 hours and poured into molds. The chocolate in each mold was solidified at 5° C. for two hours, taken out from the mold and aged at 20° C. for one week.

Table 8 shows blooming resistance and melting profiles of the non-tempered chocolate products containing the invention inhibitor (1) in various ratios.

TABLE 8

| Ex. No. | Fat composition (%)*[1] Invention inhibitor (1) | Non-tempered hard butter | Cocoa butter | Number of cycles until blooming occurred | Melting profiles*[2] |
|---|---|---|---|---|---|
| Control | 0 | 80 | 20 | 18 | A |
|  | 0 | 70 | 30 | 12 | A |
|  | 0 | 60 | 40 | 7 | A |
|  | 0 | 50 | 50 | 6 | A |
| 5-1 | 1 | 69 | 30 | 18 | A |
| 5-2 | 1 | 59 | 40 | 11 | A |
| 5-3 | 1 | 49 | 50 | 9 | A |
| 5-4 | 2 | 68 | 30 | 21 | A |
| 5-5 | 2 | 58 | 40 | 15 | A |
| 5-6 | 2 | 48 | 50 | 11 | A |
| 5-7 | 5 | 65 | 30 | 29 | A |
| 5-8 | 5 | 55 | 40 | 23 | A |
| 5-9 | 5 | 45 | 50 | 17 | A |
| 5-10 | 10 | 60 | 30 | 34 | A |
| 5-11 | 10 | 50 | 40 | 29 | A |
| 5-12 | 10 | 40 | 50 | 22 | A |
| 5-13 | 20 | 50 | 30 | 37 | A~B |
| 5-14 | 20 | 40 | 40 | 33 | A~B |
| 5-15 | 20 | 30 | 50 | 25 | A |

*[1]A ratio to the total fat component in the chocolate (the same applies to Tables 9, 10 and 11).
*[2]A: good, B: slightly poor and C: poor (the same applies to Tables 9, 10 and 11).

EXAMPLE 6

Non-tempered chocolate products of the same composition as described in Example 5 containing the invention inhibitor (2) in various ratios were produced in the same manner as described in Example 5 and the blooming resistance and melting profiles of each product were examined. Table 9 shows the result.

TABLE 9

| Ex. No. | Fat composition (%) Invention inhibitor (2) | Non-tempered hard butter | Cocoa butter | Number of cycles until blooming occurred | Melting profiles*[1] |
|---|---|---|---|---|---|
| Control | 0 | 70 | 30 | 12 | A |
|  | 0 | 60 | 40 | 7 | A |
|  | 0 | 50 | 50 | 6 | A |
| 6-1 | 1 | 69 | 30 | 18 | A |
| 6-2 | 1 | 59 | 40 | 12 | A |
| 6-3 | 1 | 49 | 50 | 8 | A |
| 6-4 | 2 | 68 | 30 | 20 | A |
| 6-5 | 2 | 58 | 40 | 15 | A |
| 6-6 | 2 | 48 | 50 | 11 | A |
| 6-7 | 5 | 65 | 30 | 27 | A |
| 6-8 | 5 | 55 | 40 | 22 | A |
| 6-9 | 5 | 45 | 50 | 17 | A |
| 6-10 | 10 | 60 | 30 | 34 | A |

TABLE 9-continued

| Ex. No. | Fat composition (%) | | | Number of cycles until blooming occurred | Melting profiles*1 |
|---|---|---|---|---|---|
| | Invention inhibitor (2) | Non-tempered hard butter | Cocoa butter | | |
| 6-11 | 10 | 50 | 40 | 28 | A |
| 6-12 | 10 | 40 | 50 | 23 | A |
| 6-13 | 20 | 50 | 30 | 36 | A~B |
| 6-14 | 20 | 40 | 40 | 33 | A~B |
| 6-15 | 20 | 30 | 50 | 26 | A |

EXAMPLE 7

Non-tempered chocolate products of the same composition as described in Example 5 containing the invention inhibitor (3) in various ratios were produced in the same manner as described in Example 5 and the blooming resistance and melting profiles of each product were examined. Table 10 shows the result.

TABLE 10

| Ex. No. | Fat composition (%) | | | Number of cycles until blooming occurred | Melting profiles |
|---|---|---|---|---|---|
| | Invention inhibitor (3) | Non-tempered hard butter | Cocoa butter | | |
| Control | 0 | 70 | 30 | 12 | A |
| | 0 | 60 | 40 | 7 | A |
| | 0 | 50 | 50 | 6 | A |
| 7-1 | 1 | 69 | 30 | 15 | A |
| 7-2 | 1 | 59 | 40 | 10 | A |
| 7-3 | 1 | 49 | 50 | 8 | A |
| 7-4 | 2 | 68 | 30 | 19 | A |
| 7-5 | 2 | 58 | 40 | 14 | A |
| 7-6 | 2 | 48 | 50 | 10 | A |
| 7-7 | 5 | 65 | 30 | 25 | A |
| 7-8 | 5 | 55 | 40 | 19 | A |
| 7-9 | 5 | 45 | 50 | 15 | A |
| 7-10 | 10 | 60 | 30 | 31 | A |
| 7-11 | 10 | 50 | 40 | 25 | A |
| 7-12 | 10 | 40 | 50 | 21 | A |
| 7-13 | 20 | 50 | 30 | 34 | B |
| 7-14 | 20 | 40 | 40 | 28 | B |
| 7-15 | 20 | 30 | 50 | 23 | A~B |

COMPARATIVE EXAMPLE 1

For comparison, non-tempered chocolate products of the same composition as described in Example 5 containing wholly hydrogenated high-erucic rapeseed oil consisting of at least 50% by weight of long-chain saturated fatty acids having 20 to 24 carbon atoms (fatty acid composition: 3.9% of palmitic acid, 41.3% of stearic acid, 5.5% of arachic acid and 46.9% of behenic acid) were produced in the same manner as described in Example 5 and the blooming resistance and melting profiles of each product were examined. Table 11 shows the result.

TABLE 11

| Comp. Ex. No. | Fat composition (%) | | | Number of cycles until blooming occurred | Melting profiles |
|---|---|---|---|---|---|
| | Ultrahardened high erucic rapeseed oil | Non-tempered butter | Cocoa butter | | |
| Control | 0 | 70 | 30 | 12 | A |
| | 0 | 60 | 40 | 7 | A |
| | 0 | 50 | 50 | 6 | A |
| 1-1 | 0.5 | 59.5 | 40 | 9 | A |
| 1-2 | 0.5 | 49.5 | 50 | 7 | A |
| 1-3 | 1.0 | 59 | 40 | 9 | A |
| 1-4 | 1.0 | 49 | 50 | 8 | A |
| 1-5 | 2.0 | 58 | 40 | 8 | A~B |
| 1-6 | 2.0 | 48 | 50 | 7 | A~B |
| 1-7 | 5.0 | 55 | 40 | 6 | B~C |
| 1-8 | 5.0 | 45 | 50 | 6 | B~C |
| 1-9 | 10.0 | 50 | 40 | 6 | C |
| 1-10 | 10.0 | 40 | 50 | 6 | C |

EXAMPLE 8

The invention inhibitor further exhibits an effect of improving the luster of chocolate.

Table 12 shows evaluation of the luster of chocolate products containing the invention inhibitor in various ratios.

TABLE 12

| Ex. No.*1 | Luster of *2 chocolate | Ex. No.*1 | Luster of *2 chocolate |
|---|---|---|---|
| Control | C | Control | C |
| 1-1 | B | 3-1 | B |
| 1-2 | A~B | 3-2 | B |
| 1-3 | A | 3-3 | A |
| 1-4 | A | 3-4 | A |
| 1-5 | A | 3-5 | A |
| 2-1 | B | 4-1 | B |
| 2-2 | A~B | 4-2 | A~B |

TABLE 12-continued

| Ex. No.*1 | Luster of *2 chocolate | Ex. No.*1 | Luster of *2 chocolate |
|---|---|---|---|
| 2-3 | A | 4-3 | A |
| 2-4 | A | 4-4 | A |
| 2-5 | A | 4-5 | A |

*1 The same composition as that shown in Tables 3, 4, 5 and 6.
*2 A: excellent, B: good, and C: poor.

EFFECTS OF THE INVENTION

EXAMPLE 9

Chocolate products of the same composition as described in Example 1 containing the invention inhibitor (5) in various ratio were produced in the same manner as described in Example 1 and the blooming resistance of each product was examined. Table 13 shows the result.

TABLE 13

| Ex. No. | Fat composition (%) Invention inhibitor (5) | Cocoa butter | Number of cycles until blooming occurred |
|---|---|---|---|
| Control | 0 | 100 | 5 |
| 9-1 | 1 | 99 | 10 |
| 9-2 | 2 | 98 | 15 |
| 9-3 | 5 | 95 | 27 |
| 9-4 | 10 | 90 | 40 |
| 9-5 | 20 | 80 | 53 |

The fat blooming inhibiting effect of the invention inhibitor comprises a mechanism of suppressing the growth of crystals formed by molten and aggregated fat crystals, bleeding of fats onto the surface of a chocolate stored at high and labile temperature or recrystallization of molten oil drops on the surface of the chocolate, in addition to the mechanism of suppressing localization, aggregation and migration of unstable crystals by converting fat crystals in hard butter and chocolates and dispersing the same similar to conventional blooming inhibitors. These two suppressing mechanisms are combined together to bring about an excellent effect of the invention inhibitor in preventing fat blooming. Thus the invention inhibitor can suppress fat blooming of chocolate at high and labile temperatures, which is difficult by prior arts.

Although the invention inhibitor consists of long-chain saturated fatty acids having a high melting point, such as arachic or behenic acid, it hardly affects melting profiles. This is because these long-chain saturated fatty acid residues are present together with unsaturated fatty acid residues having a low melting point in the same molecule, i.e. forming mixed acid triglyceride(s). As occasion demands, the high melting triglycerides such as trisaturated glycerides would be removed by fractionation, the invention inhibitor can be added to the chocolate products in an amount of approximately 20% of weight of starting oils without affecting the melting profiles and texture of chocolate products.

In addition to the effect of improving the blooming resistance of a chocolate product, the invention inhibitor further exhibits an effect of significantly improving the luster of the product.

The embodiments of the invention in which an exclusive property or privilege is claimed are defined as follows:

1. A fat blooming inhibitor comprising a mixture of triglycerides, said mixture containing from 40 to 100 percent by weight of a mixed-acid, triglyceride component, said triglyceride component containing, in the same molecule as different fatty acid moieties, both saturated fatty acids having 20 to 24 carbon atoms and unsaturated fatty acids having from 16 to 22 carbon atoms, the amount of said saturated fatty acids in said mixture being from 15 to 70 percent by weight and the amount of said unsaturated fatty acids in said mixture being from 20 to 60 percent by weight, both percentages being based on the total weight of the fatty acid moieties present in said mixture.

2. A fat blooming inhibitor as claimed in claim 1 in which said mixture of triglycerides contains from 50 to 100 percent by weight of said mixed-acid, triglyceride component.

3. A fat blooming inhibitor as claimed in claim 1 in which said saturated fatty acid in said mixed-acid, triglyceride is at least one of arachic acid and behenic acid and said unsaturated fatty acid in said mixed-acid, triglyceride is at least one of oleic acid, linoleic acid and linolenic acid.

4. A fat blooming inhibitor as claimed in claim 1 wherein said mixed-acid, triglyceride component is prepared by interesterifying a fatty acid triglyceride containing at least 30 percent by weight of saturated fatty acids having 20 to 24 carbon atoms, with a vegetable oil containing at least 60 percent by weight of unsaturated fatty acids having 16 to 22 carbon atoms, and recovering said fat blooming inhibitor from the interesterification reaction product.

5. A fat blooming inhibitor as claimed in claim 1 wherein said mixed-acid, triglyceride component is prepared by subjecting vegetable oil containing at least 60 percent by weight of unsaturated fatty acid having 16 to 22 carbon atoms at the $\beta$-position of the triglyceride nucleus, and saturated fatty acid having 20 to 24 carbon atoms to an enzymatic selective interesterification, removing fatty acids from the reaction product and recovering said fat blooming inhibitor from the reaction product.

6. A fat blooming inhibitor as claimed in claim 1, which consists essentially of
    up to 5.0% of PPU triglyceride,
    from 0.5 to 20.4% of PSU triglyceride,
    from 2.4 to 24.7% of SSU triglyceride,
    from 7.2 to 14.7% of ASU triglyceride,
    from 24.6 to 34.7% of AAU and BSU triglycerides,
    from 2.0 to 12.2% of ABU triglyceride,
    from 6.8 to 47.5% of BBU triglyceride, and
    from 0.2 to 2.6% of BBA triglyceride,
    wherein P represents palmitic acid, S represents stearic acid,
    U represents unsaturated acids having 18 carbon atoms,
    A represents arachic acid and B represents behenic acid.

7. A hard butter composition which comprises a hard butter and 0.5 to 30 wt.% of the fat blooming inhibitor as defined in claim 1.

* * * * *